(No Model.)
F. D. OWEN.
TIRE FOR VEHICLES.
No. 507,090. Patented Oct. 17, 1893.
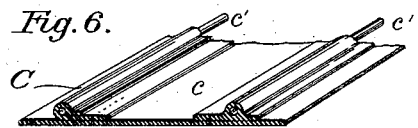
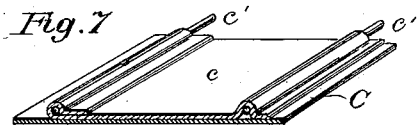
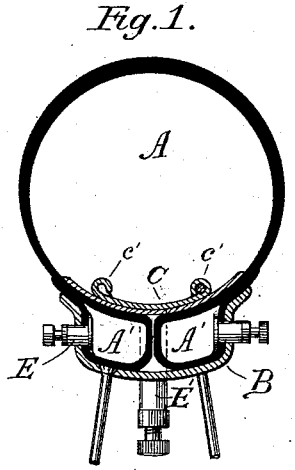
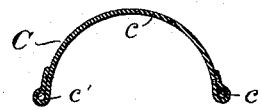
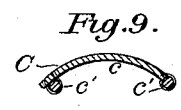
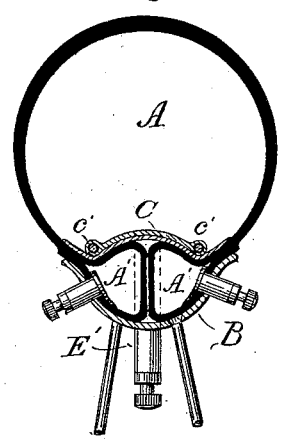
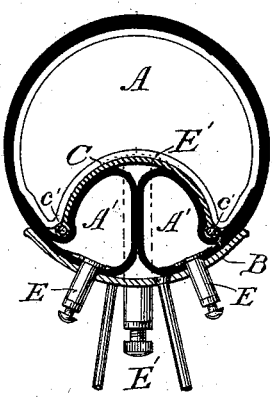
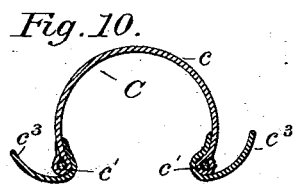
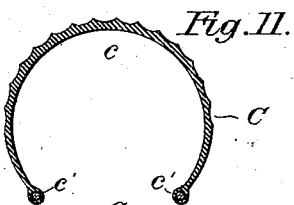
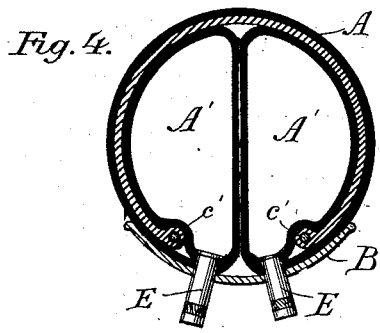
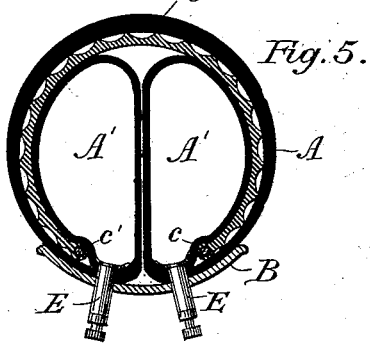
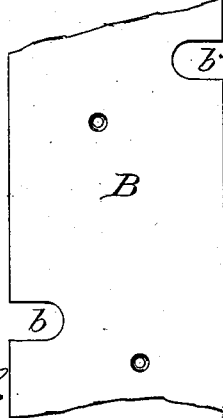
Witnesses
Henry E. Cooper.
Sidney P. Hollingsworth
Inventor
Frederick D. Owen.

UNITED STATES PATENT OFFICE.

FREDERICK D. OWEN, OF WASHINGTON, DISTRICT OF COLUMBIA.

TIRE FOR VEHICLES.

SPECIFICATION forming part of Letters Patent No. 507,090, dated October 17, 1893.

Application filed April 18, 1893. Serial No. 470,862. (No model.)

*To all whom it may concern:*

Be it known that I, FREDERICK D. OWEN, a citizen of the United States, residing at 1423 New York avenue, Washington, in the District of Columbia, have invented certain new and useful Improvements in Tires for Vehicles; and I do hereby declare the following to be a full, clear, and exact description of the invention, such as will enable others skilled in the art to which it appertains to make and use the same.

This invention relates to that class of pneumatic tires for bicycles and other vehicles, composed of an endless ribbon or band of rubber or other suitable material provided at its edges with a bead, swell or enlargement to engage the rim of a wheel.

One object of my invention is to afford greater security against the accidental dislodgment of the enlarged edges of a tire band from their seats in the rim, by the employment of a keeper or retaining band located within the tire.

Another object of the invention is to prevent the cutting of the tire by the wheel rim in case of its accidental puncture or other injury which would result in the escape of air from said tire, and consequent collapse thereof.

Another object of the invention is to provide for the more ready attachment of a tire to the rim or felly and detachment therefrom.

With these and minor objects in view the invention consists in the matters to be hereinafter described in detail, and then pointed out in the claims.

In the accompanying drawings, Figures 1, 2, 3, 4, and 5 are transverse sections through a rim and tire, showing a keeper band adapted to various forms thereof. Figs. 6 and 7 are perspective views of short sections of the keeper band, showing some of the many ways of securing the wires therein. Figs. 8, 9, 10, and 11 are sectional details of the keepers shown in Figs. 1 to 5. Fig. 12 is a plan view of a section of rim, embodying a part of my invention.

The tire herein shown, is formed in whole or in part of an endless band A of rubber, or other suitable material rendered air-tight, the side edges of said band A being provided with circumferential air-tight inflatable pockets A' formed in any approved manner, as, for instance, by folding said edges back upon the body of the band A and cementing or otherwise securing said edges to leave or form said hollow pockets A'. These pockets are seated side by side in a rim of proper cross sectional contour, and inflated, in the usual manner of inflating rubber tires, to cause the walls of the respective pockets A' to abut snugly against each other and the sides of the rim B, thus forming an air-tight joint between the walls of said pockets, and wedging said pockets within the rim, all of which is set forth in detail in a joint application for Letters Patent filed by myself and another, and pending at the date of filing of this present application.

To avoid more certainly the accidental dislodgment of the enlarged or inflated circumferential edges or pockets of the tire from the rim I have devised a keeper or retaining band C to be located within the tire adjacent to the edges of the rim B, the edges of said keeper C being so positioned with relation to the edges of the rim that the pockets cannot be removed from the rim without deflation.

The relative proportions and positions shown in the drawings are illustrated merely and will be followed only so far as practical experience shall warrant.

The form of keeper or retaining band C illustrated comprises a band *c* of suitable material, preferably arched transversely, and stiffened at its edges (which are designed to rest adjacent to the edges of the rim) to resist pressure at any one point and distribute such pressure throughout the circumference of the rim.

Where metal, or other somewhat unyielding material is employed to form the keeper C, the stiffening of the edges thereof may consist in "tin wire edging" the keeper, that is to say, by rolling the edges in the same manner as is practiced in the manufacture of sheet metal ware, but I prefer to use a material other than metal for the manufacture of such keepers and to incase a steel or other hoop *c'* or ring in each edge of said keeper in order that said edges of the keeper may have some resiliency, and sufficient strength to withstand any lateral pressure which is likely to be exerted upon the tire. Various materials may be employed in the construction of this retaining band C, such as rubber, leather, or rubber incorporated with a textile fabric, now so commonly employed in the manufacture of tires, and the metal hoops $c'$ may be secured to the edges of said band in any approved or preferred manner to the end that they are retained at a determined distance apart, practically, and in a certain relation with respect to the rim and the enlargements or pockets $A'$ of the tire. For instance, the body $c$ of the retaining band may be formed of a band of rubber, as in Figs. 6 and 8, the wire hoops $c'$, being secured by an overlying strip $c^2$ (Fig. 6) cemented or vulcanized to the band $c$, or the edges of said band may be folded over said hoops $c'$ and cemented as in Fig. 8, or the hoops $c'$ may be secured by stitching to a band $c$ of leather of more or less stiffness, as in Figs. 3 and 10, the retainer C in this instance forming an arched band of sufficient rigidity to support the weight of the rider, and keep the tire from contact with the rim B, in case of deflation through an accidental puncture, thus enabling the rider to use his wheel without fear of cutting his tire after such deflation by contact with the edges of the rim. One advantage derived from the employment of such a retaining band, with the described type of tire is that it forms a seal for the joint between the meeting or abutting edges of the tire band, thus lessening the liability of leakage, and in the form of retainer shown in Figs. 3 and 10, illustrating a somewhat stiff or rigid leather retainer, I have provided soft rubber flaps $c^3$, at the edges thereof, to be pressed outward against the wall of the tire A by the air confined therein, so providing a valve at each side of the abutting edges of said tire.

The surface of the band $c$, or of the flaps $c^3$ may be coated with some liquid substance or compound before insertion in the tire, to more certainly seal the joint of the tire, and I prefer to use a liquid or substance that will retain its moisture, a liquid, for instance, having the qualities of glycerine and one that is not detrimental to rubber or steel.

While my retaining band has been designed with special reference to a tire formed of a single endless band, such as hereinbefore referred to, it will be apparent that it may be employed with advantage in tires in which an air tube B is inclosed, and retained by an outer cover, which latter may be identical in form with the tire A here shown, or of such form slightly modified by constructing the enlarged edges of the tire band solid, instead of in the form of hollow inflatable pockets, as shown.

I would here remark that separate unconnected steel hoops $c'$ $c'$ located within the tire in juxtaposition to the respective edges of the rim would very well serve the purpose of preventing the accidental dislodgment of the tire from the rim, and especially used in connection with the forms of tire shown in Figs. 3, 4 and 5, but difficulty might be found in seating such separate hoops accurately within the tire, which objection is avoided by making said hoops a part of retainer C, shown, as the proper seating of one edge of said retainer (including its hoop $c'$) involves the proper seating of the other edge thereof, for the reason that said edges of the retainer, including the hoops $c'$ will be positioned with sufficient accuracy to automatically assume the required position within the tire when the latter is inflated.

It will of course be understood that the form of the body $c$ of the keeper or retaining band C may be modified to suit special requirements or the views of different manufacturers or users, as for instance its outer surface may be corrugated, as shown in Fig. 5, or the band may be of perforated or skeleton form to reduce weight.

The circumferential hollow pockets $A'$ are each provided with an air supply nozzle E of any approved form, through which said pockets may be inflated after being arranged within the rim, and to afford greater facility for seating and removing the tire, the rim is provided at the sides with notches $b$ to receive said supply nozzle, thereby avoiding the necessity of inserting said nozzle through a drilled hole in the rim, or withdrawing it from said hole. This not only adds to the convenience of manipulating the tire, but tends to preserve the joint between the supply nozzles and tire in more perfect condition as said nozzles are readily removed from the rim without bending or kinking the material of the tire.

When the tire band A constitutes the air tube of the tire the keeper or retainer serves the threefold purpose of preventing slip, of sealing the joint between the edges of the band, and, in the form shown in Fig. 3, pressing the abutting edges of the band A toward or against each other.

In a tire constructed as shown in Figs. 4 and 5, the edge pockets $A'$ constitute not only the means for securing the tire band within the rim of a wheel, but also the air tube or tubes of the tire, the integral body, or that part of said band between the pockets constituting the outer protecting cover only which is not designed, of itself, to contain air under pressure, and therefore is not provided with an air supply nozzle, but in the forms shown in Figs. 1, 2 and 3, wherein a body of air under pressure is confined between the body of the tire band and the inflated pockets thereof, an air supply nozzle $E'$ may be conveniently attached to the retainer C, as shown.

What I claim is—

1. The combination with a wheel rim, of a tire band having inflatable pockets at its edges and a retainer located within said tire band to prevent the inflated edges thereof slipping past the edges of the rim, substantially as described.

2. The combination with a wheel rim, of a tire band having inflatable pockets at its edges, and a retainer located within said tire band and having wired edges arranged to prevent the slipping of the inflated pockets of the tire band past the edges of the rim, substantially as described.

3. The combination with a wheel rim, of a tire band having inflatable pockets at its edges, and an arched retainer located within said tire band and having wired edges to prevent the slipping of the inflated pockets of the tire band past the edges of the rim, substantially as described.

4. The combination with a wheel rim, and a pneumatic tire consisting of a band the edges of which are provided with inflatable pockets seated in said rim to abut against each other, of a retainer seated within the tire band to overlap the abutting edges thereof and provided with wired edges to prevent slipping of the inflated edges of the tire past the edges of the rim, substantially as described.

5. The combination with a wheel rim, and a pneumatic tire consisting of a band the edges of which are provided with inflatable pockets seated in said rim, of a retainer located within the tire band to seal the joint between the edges thereof, and provided with wired edges to prevent dislodgment of the inflated edges of the tire band, substantially as described.

6. The combination of a wheel rim and a pneumatic tire consisting of a band the edges of which are provided with inflatable pockets seated in said rim, of a retainer located within the tire band and provided with wired edges arranged to press the edges of a tire band toward and projecting beyond the edges of the rim to support the tire free from said edges in case of deflation, substantially as described.

7. The combination with a wheel rim and a tire band seated therein, of a retainer located in said tire band consisting of relatively rigid non-metallic material arched transversely and having wired edges positioned adjacent to the edges of the rim; the central arched part of the retainer being of greater diameter than the edges of the rim, substantially as described.

8. The combination with a wheel rim, of a tire band provided at its edges with inflated tubular pockets, adapted to be seated in said rim, and a retainer arranged within the tire band, consisting of a body or band, having wired edges located adjacent to the edges of the wheel rim; the body of said retainer being interposed between the body of the tire band and its circumferential inflatable pockets, substantially as described.

In testimony whereof I affix my signature in presence of two witnesses.

FREDERICK D. OWEN.

Witnesses:
HENRY E. COOPER,
SIDNEY P. HOLLINGSWORTH.